United States Patent
Wang et al.

(10) Patent No.: US 11,620,435 B2
(45) Date of Patent: Apr. 4, 2023

(54) DOMAIN SPECIFIC MODEL COMPRESSION

(71) Applicant: International Business Machines Corporation, Armonk, NY (US)

(72) Inventors: Haoyu Wang, Somerville, MA (US); Yang Yu, Acton, MA (US); Ming Tan, Malden, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 16/597,920

(22) Filed: Oct. 10, 2019

(65) Prior Publication Data

US 2021/0109991 A1    Apr. 15, 2021

(51) Int. Cl.
| | |
|---|---|
| *G06F 17/00* | (2019.01) |
| *G06F 40/12* | (2020.01) |
| *G06N 20/10* | (2019.01) |
| *G06N 3/08* | (2023.01) |

(52) U.S. Cl.
CPC .............. *G06F 40/12* (2020.01); *G06N 3/08* (2013.01); *G06N 20/10* (2019.01)

(58) Field of Classification Search
CPC ........ G06N 3/0454; G06N 3/08; G06N 20/00; G06N 3/084; G06N 3/088; G06N 3/0481; G06N 20/10; G06N 3/02; G06N 7/005; G06N 3/082; G06F 40/30; G06F 17/18; G06F 16/285; G06F 16/35; G06F 30/20; G06F 40/295; G06F 40/279; G06F 16/55; G06F 40/00; G06F 17/15; G06F 16/906; G06F 16/65; G06F 40/237; G06F 40/263; G06F 40/12; G06F 40/10; G06F 40/20; G06Q 10/04

See application file for complete search history.

(56) References Cited

U.S. PATENT DOCUMENTS

| | | |
|---|---|---|
| 6,092,038 A | 7/2000 | Kanevsky |
| 6,782,357 B1 | 8/2004 | Goodman |
| 8,655,647 B2 | 2/2014 | Moore |

(Continued)

FOREIGN PATENT DOCUMENTS

| | | |
|---|---|---|
| CN | 108415888 A | 8/2018 |
| CN | 109359724 A | 2/2019 |

(Continued)

OTHER PUBLICATIONS

Xiaotian Zhu, Wengang Zhou, and Houqiang Li. 2018. Improving deep neural network sparsity through decorrelation regularization. In Proceedings of the 27th International Joint Conference on Artificial Intelligence (IJCAI'18). AAAI Press, 3264-3270. (Year: 2018).*

(Continued)

*Primary Examiner* — Michael Ortiz-Sanchez
(74) *Attorney, Agent, or Firm* — David K. Mattheis

(57) ABSTRACT

Domain specific model compression by providing a weighting parameter for a candidate operation of a neural network, applying the weighting parameter to an output vector of the candidate operation, performing a regularization of the weighting parameter output vector combination, compressing the neural network model according to the results of the regularization, and providing the neural network model after compression.

20 Claims, 4 Drawing Sheets

(56) References Cited

U.S. PATENT DOCUMENTS

| | | | |
|---|---|---|---|
| 8,725,509 | B1 | 5/2014 | Harb |
| 10,223,635 | B2 | 3/2019 | Annapureddy |
| 2007/0078653 | A1 | 4/2007 | Olsen |
| 2007/0233477 | A1 | 10/2007 | Halowani |
| 2016/0217369 | A1 | 7/2016 | Annapureddy |
| 2017/0220897 | A1 | 8/2017 | Chidlovskii |
| 2018/0024968 | A1 | 1/2018 | Clinchant |
| 2018/0032867 | A1* | 2/2018 | Son .................. G06F 7/523 |
| 2018/0165554 | A1* | 6/2018 | Zhang .............. G06N 7/005 |
| 2019/0138896 | A1* | 5/2019 | Deng ............... G06N 3/0445 |
| 2019/0392323 | A1* | 12/2019 | Yan ................. G06N 3/084 |
| 2020/0042596 | A1* | 2/2020 | Ravi ................ G06N 3/063 |
| 2020/0134461 | A1* | 4/2020 | Chai ................ G06N 3/088 |
| 2020/0334599 | A1* | 10/2020 | Zayats .............. G06F 40/44 |

FOREIGN PATENT DOCUMENTS

| | | |
|---|---|---|
| CN | 109448706 A | 3/2019 |
| CN | 110222820 A | 9/2019 |
| JP | 5961532 B2 | 8/2016 |
| WO | 2019079749 A1 | 4/2019 |

OTHER PUBLICATIONS

"Domain Specific Model Compression", International application No. PCT/IB2020/059205, International filing date Oct. 1, 2020, 21 pages.

International Searching Authority, Patent Cooperation Treaty, Notification of Transmittal of the International Search Report and the Written Opinion of the International Searching Authority, or the Declaration, dated Jan. 21, 2021, International application No. PCT/IB2020/059205, 9 pages.

Acharya et al., "Online Embedding Compression for Text Classification using Low Rank Matrix Factorization", AAAI, 2019, arXiv:1811.00641v1 [cs.LG] Nov. 1, 2018, 9 pages.

Ba et al., "Do Deep Nets Really Need to be Deep?", Draft for Advances in Neural Information Processing Systems 2014, arXiv:1312.6184v7 [cs.LG] Oct. 11, 2014, 10 pages.

Denton et al. "Exploiting Linear Structure Within Convolutional Networks for Efficient Evaluation", Advances in Neural Information Processing Systems, 2014, arXiv:1404.0736v2 [cs.CV] Jun. 9, 2014, 11 pages.

Gong et al., "Compressing Deep Convolutional Networks using Vector Quantization", Under review as a conference paper at ICLR 2015, arXiv:1412.61151 [cs.CV] Dec. 18, 2014, 10 pages.

Hinton et al., "Distilling the Knowledge in a Neural Network", arXiv:1503.02531v1 [stat.ML] Mar. 9, 2015, 9 pages.

Strimel et al., "Statistical Model Compression for Small-Footprint Natural Language Understanding", Interspeech 2018, Sep. 2-6, 2018, Hyderabad, 10.21437/Interspeech.2018-1333, pp. 571-575.

Tai et al., "Convolutional Neural Networks With Low-Rank Regularization", Published as a conference paper at ICLR 2016, arXiv:1511.06067v3 [cs.LG] Feb. 14, 2016, 11 pages.

Vanhoucke et al., "Improving the speed of neural networks on CPUs", Published 2011, 8 pages.

Mell et al., "The NIST Definition of Cloud Computing", Recommendations of the National Institute of Standards and Technology, Special Publication 800-145, Sep. 2011, 7 pages.

* cited by examiner

DOMAIN SPECIFIC MODEL COMPRESSION

BACKGROUND

The disclosure relates generally to the compression of machine learning models. The disclosure relates particularly to reducing machine learning model computing requirements by a domain specific model compression.

Artificial intelligence models, such as convolutional neural networks (CNN), are widely known. Such models provide the capability to recognize patterns in incoming data, and then respond in a predictable manner. These models are trained using data sets similar to the data the model will be used to process. After training, the models process incoming data producing outputs according to the training of the model.

Trained models can be overly complex. Regularization can be used to reduce the complexity of a trained model. Regularization changes the cost function of the model and adds a penalty term to the cost function which penalizes complex model terms, resulting in trained models having less complexity.

Ridge, or L2, regularization is used to generalize an overfitted regression model, reducing the complexity of the model and improving the ability of the model to handle data beyond a training data set. Ridge regularization adds a penalty term associated with the square of the coefficient to the cost function to reduce model complexity and the resulting over fitting of the model.

Lasso, (Least Absolute Shrinkage and Selection Operator), or L1, regularization adds a term associated with the absolute value of the coefficient to the cost function to remove less important, or impactful features from a function.

SUMMARY

Aspects of the invention disclose methods, systems and computer readable media associated with domain specific model compression by providing a weighting parameter for a candidate operation of a neural network, applying the weighting parameter to an output vector of the candidate operation, performing a regularization of the weighting parameter output vector combination, compressing the neural network model according to the results of the regularization, and providing the neural network model after compression.

DETAILED DESCRIPTION

Figure 1:
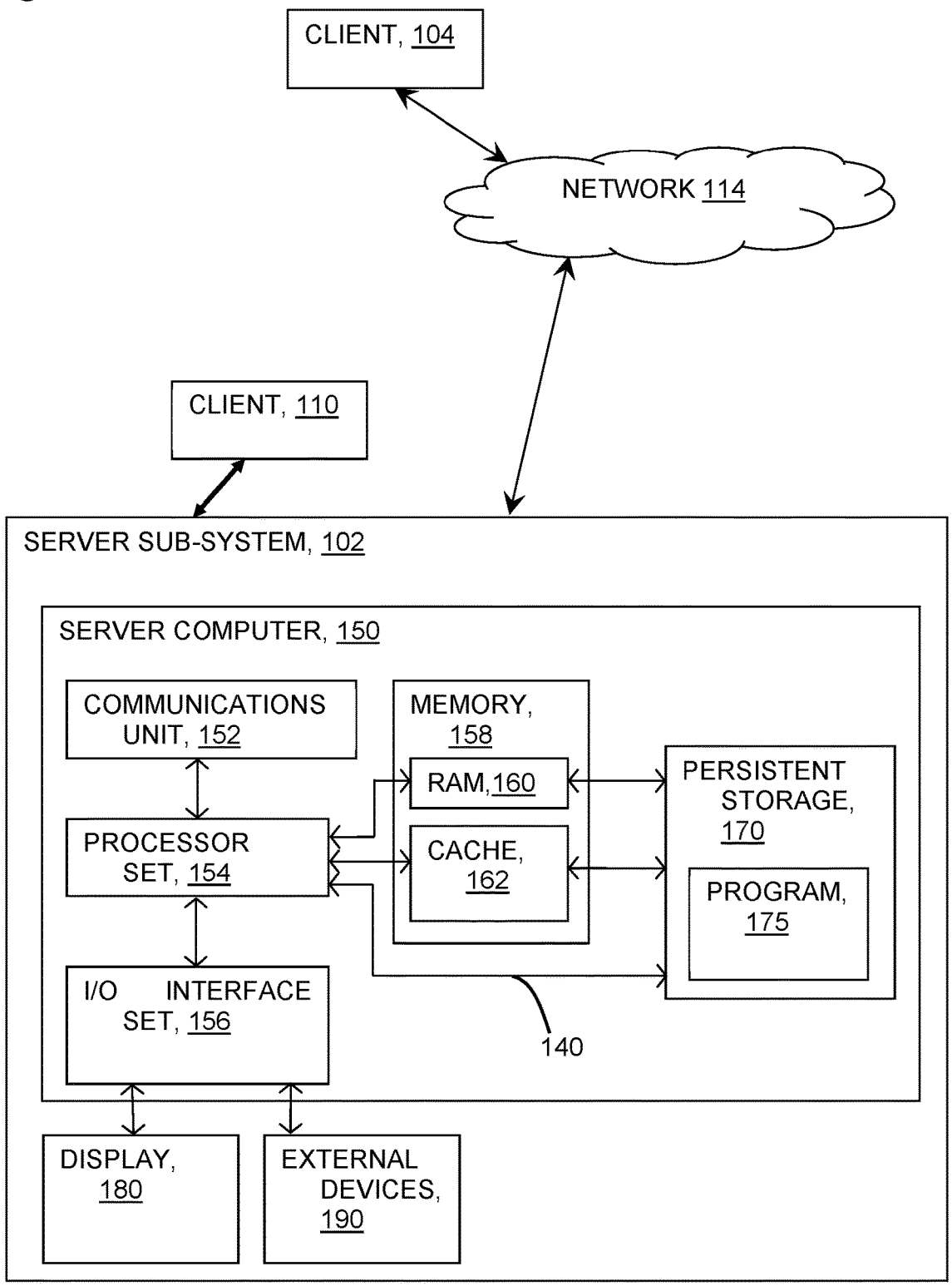
FIG. 1 provides a schematic illustration of a system, according to an embodiment of the invention.

Pre-trained language models have been found applicable to tasks beyond their original scope. The use of models such as the Bidirectional Encoder Representations from Transformers (BERT), and the Generative Pre-Training (GPT) model have been extended beyond the tasks for which the models were originally proposed. These models typically require large computational resources in order to have reasonable training times. Even after training is complete the computational resources required for inference using these models can also be large to achieve desired operations per second levels.

The intent classification accuracy of deep learning models may be improved by the addition of pre-trained language models to the deep learning model. The addition is not trivial as the models may contain millions of parameters and be computationally expensive. Being able to compress the integrated model and reduce the computation costs would improve performance while providing a low-cost option. What is needed is a method to compress task specific deep learning models to reduce the required computing resources and costs.

In an embodiment, the method begins with a pre-trained language model. In this embodiment, the pre-trained model may be a BERT, GPT, ELMo, or other language model. The model may be a TRANSFORMER based model, recursive neural network (RNN), or convolutional neural network (CNN) based model having repeating patterns in the model network. In an embodiment, the model is pre-trained to process a particular domain, such as a particular language or subject matter area, sports, finance, general news, science news, etc. In this embodiment, the model may also be pre-trained to complete a defined task such as language translation, natural language processing, question answering, text classification, etc. (Note: the terms "BERT", "GPT", ELMo", and "TRNASFORMER" may be subject to trademark rights in various jurisdictions throughout the world and are used here only in reference to the products or services properly denominated by the marks to the extent that such trademark rights may exist.)

In an embodiment, the method introduces an extra weighting parameter, $w_i$, for each path or candidate operation of the pre-trained model. In an embodiment using a BERT model, the additional weighting parameter is introduced for each attention head of each layer of the model. The model multiplies the output vectors of each layer of the model by the new weighting parameter. In an embodiment, the initial values of the new weighting parameters are all set to 1. Multiplying these parameters across the output vectors has no effect upon the model.

In an embodiment, the method uses the revised model including the new weighting parameter to process a set of unlabeled data—data which has not been categorized or classified with labels explaining or otherwise segmenting the data. In this embodiment, the method performs a regularization on the new weighting coefficient. In this embodiment, the regularization is either an L1, or L2, regularization based on the weighting factor.

L1 regularization modifies the cost function of the model. In an embodiment, the method modifies the cost function by adding a term including the absolute value of the new weighting parameter $w_i$. In this embodiment, optimizing the modified cost function will identify candidate operations representing less important features of the processing model. In this embodiment, the values of the weighting parameters fall to zero as the model processes the unlabeled data. In an embodiment, removing less important candidate operations in this manner forces the remaining operations to capture the information represented by these less important candidate operations. In this embodiment, the number of non-zero candidate operations is reduced while the overall information content of the model is retained.

In an embodiment, using L1 regularization, a user specifies the proportion of zero value candidate operations the regularization should yield as well as a desired model accuracy. In this embodiment, the user may also specify a small, non-zero weighting parameter value to include in the proportion of candidate operations yielded by the regularization. In this embodiment, the method balances the speed against the accuracy of the regularized model. In this embodiment, model speed is impacted as candidate operations having zero weighting are no longer calculated. In this embodiment, the method yields a proportion of zero value candidate operations for the model where increasing the number of zero value candidate operations decreases the accuracy and decreasing the number of zero value candidate operations decreases the model's speed.

In an embodiment, the method revises the pre-trained model by removing all candidate operations having a zero-value weighting parameter $w_i$ after the regularization is complete. In this embodiment, the revised model is compressed, uses fewer resources and achieves acceptable accuracy in its domain and task.

In an embodiment, the method uses L2 regularization to compress the model. In this embodiment, the method again adds a new weighting parameter to the candidate operations of the model. In this embodiment, the method modifies the cost function of the model by adding a penalty term associated with the square of the weighting parameter rather than the absolute value of the parameter. In this embodiment, the regularization proceeds, optimizing the modified cost function. In this embodiment, a user specifies a threshold level for the weighting parameter and a desired proportion of candidate operations below this threshold, as well as a desired model accuracy. The method proceeds with regularization using the unlabeled data until the combination of the desired proportion of candidate operations having weighting parameter values below the threshold, and the desired accuracy, is achieved.

In an embodiment, the method expands the regularization of the model using the additional weighting parameter, by also adding one or more additional task term to the cost function of the model. The addition of such terms to the cost function yields a regularized and compressed model capable of achieving the original task in the original domain as well as the added task. In this embodiment, a revised model processes labeled data—data characterized according to one or more of its attributes—after the addition of the additional task and regularization terms to the cost function of the model. For example, a single objective model for language modeling can be expanded to include a text classification for an intent detection task by adding the weighted text classification term to the cost function of the model and processing labeled text classification for intent data with the revised version of the model.

In an embodiment, the method provides the compressed model for use directly or for integration with another model related to the same domain. In this embodiment, the integration of the compressed model adds additional task features such as machine translation, natural language processing, question answering, text classification, etc., to the original model in the domain. In this embodiment, the compressed and integrated models are offered for use as cloud service, edge cloud services, and stand-alone local service offerings due to the compression of the model according to the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise model compression program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the model compression program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., model compression program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
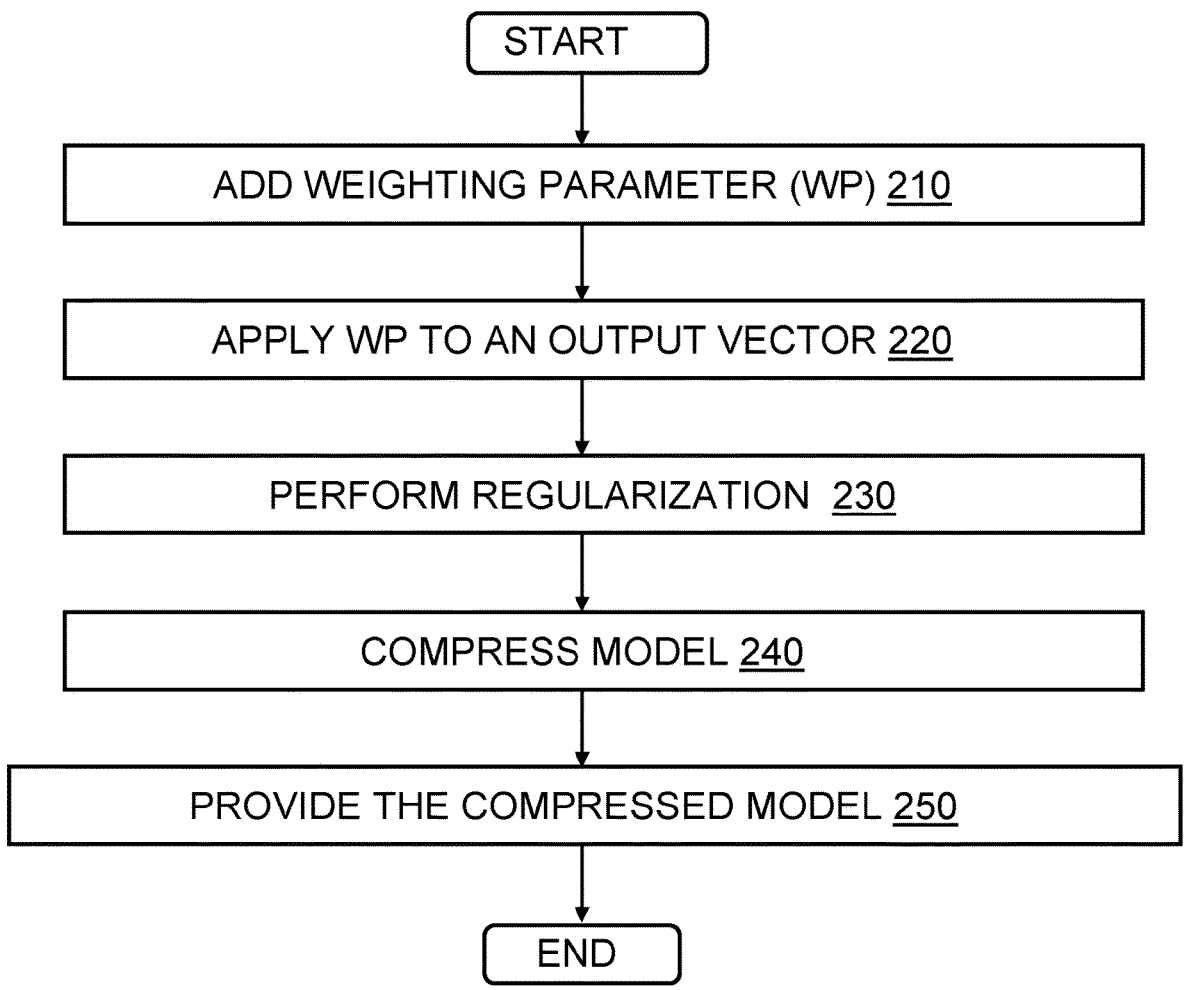
FIG. 2 provides a flowchart depicting an operational sequence, according to an embodiment of the invention.

FIG. 2 provides a flowchart 200, illustrating exemplary activities associated with the practice of the disclosure. After program start, at 210, program 175 adds a weighting parameter, or coefficient, to candidate operations of a trained neural network. The neural network can be trained for machine translation, natural language processing, question answering, text classification, etc. The neural network can be a TRANSFORMER-based model, RNN, CNN, or any other neural network architecture having repeating patterns associated with the candidate operations of the neural network. In an embodiment, the neural network comprises a BERT model having 12 levels and 12 attention heads, or candidate operations, per level.

In an embodiment, at 220, program 175 applies the weighting parameter $w_i$ to the output vectors of the candidate operations of the trained neural network. In this embodiment, the method initially sets the weighting parameters to a value of 1.0. Application of these unitary value weighting parameters has no immediate impact on the output of the model. In this embodiment, the method applies the weighting parameters to the output vectors of the candidate operations at each level of the neural network model, for example, to the output vectors of the 12 levels of the BERT model.

In an embodiment, at 230, program 175 performs a regularization of the model. In this embodiment, the method performs an L1, or L2 regularization of the model based upon the weighting parameter $w_i$. In this embodiment, the method performs the regularization using unlabeled data as the input to the model. The regularization identifies candidate operations having little or no impact upon the output of a layer and of the overall model. The coefficients of identified candidates are gradually reduced from their initial values of 1 as the regularization proceeds. In an embodiment, the method uses L1 regularization to identify candidate operations having a zero-value coefficient while processing the unlabeled data. In this embodiment, the method sets a threshold for the number of zero weighted candidate operations the regularization should yield. In this embodiment, the method sets the threshold to maximize the number of zero-value coefficient candidate operations regularization identifies without reducing model accuracy. Candidate operations with zero-value coefficients typically have little if any impact on model output accuracy.

In an embodiment, the method uses L2 regularization to identify candidate operation having a low impact on the model output. In this embodiment, the method sets a threshold defining low impact on the model, and the method sets a second threshold defining the number of candidate operations below the low impact threshold that the regularization process should yield. In this embodiment, the method sets these thresholds as a balance between maximizing the number of candidate operations identified and reducing model accuracy.

In an embodiment, at 240, program 175 compresses the model by removing candidate operations identified at step 230. The method uses thresholds of step 230 to identify a maximum number of candidate operations which can be ignored without affecting model accuracy. In this embodiment, the method removes these identified candidate operations from the model, compressing the size and computational complexity of the model, and increasing model execution speed. Properly set thresholds ensure that the compressed model provides accurate results.

In an embodiment, at 250, program 175 provides the compressed model for use. The compressed model has fewer candidate operations than the original model, requires less memory and CPU resource to store and run the model. In an embodiment, the compressed model is more portable in the sense that the model requires fewer system resources and can be utilized on a wider range of systems. For example, a model developed using extensive cloud resources can be compressed to a point where it can be utilized on edge cloud or local computing resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
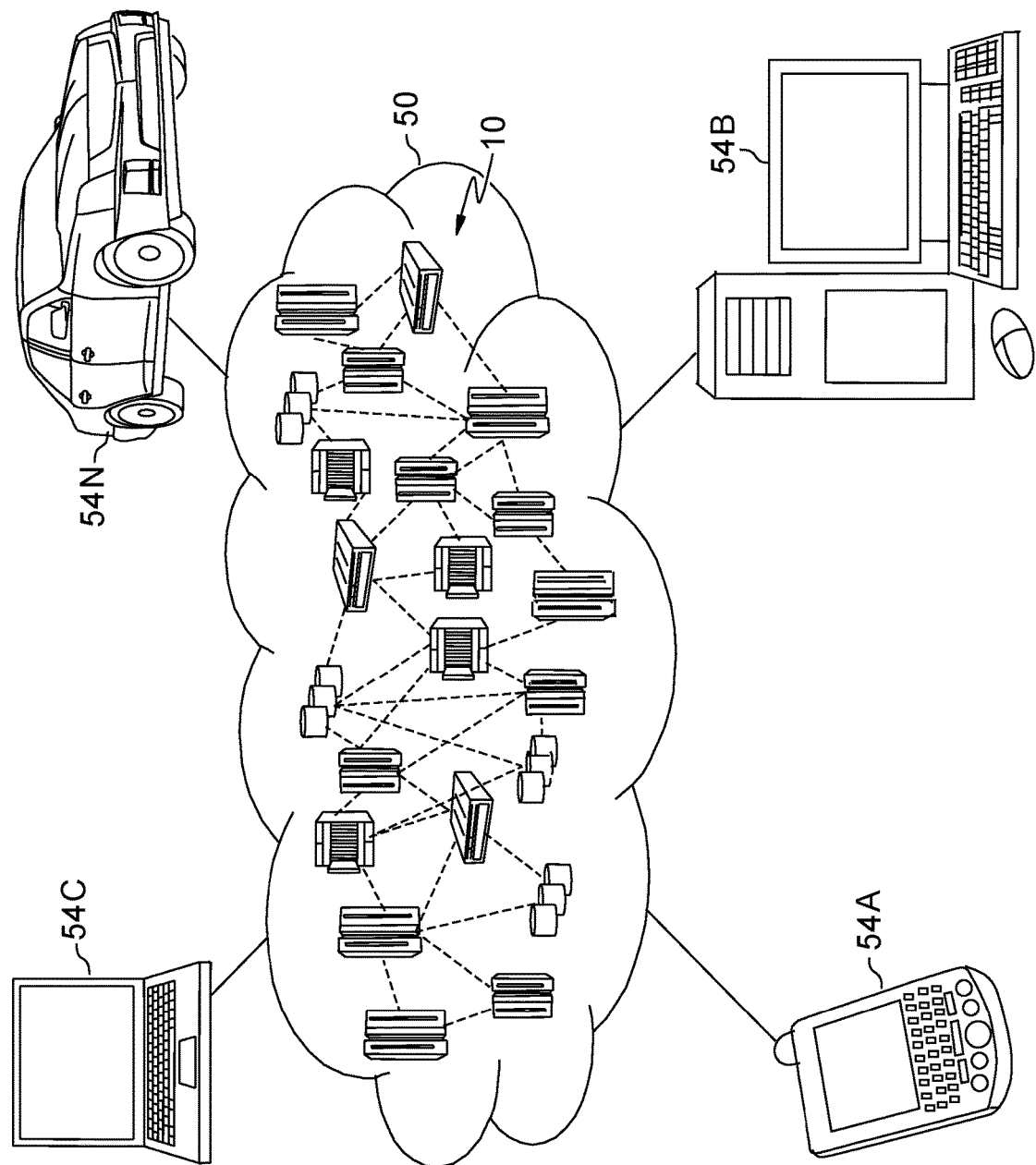
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
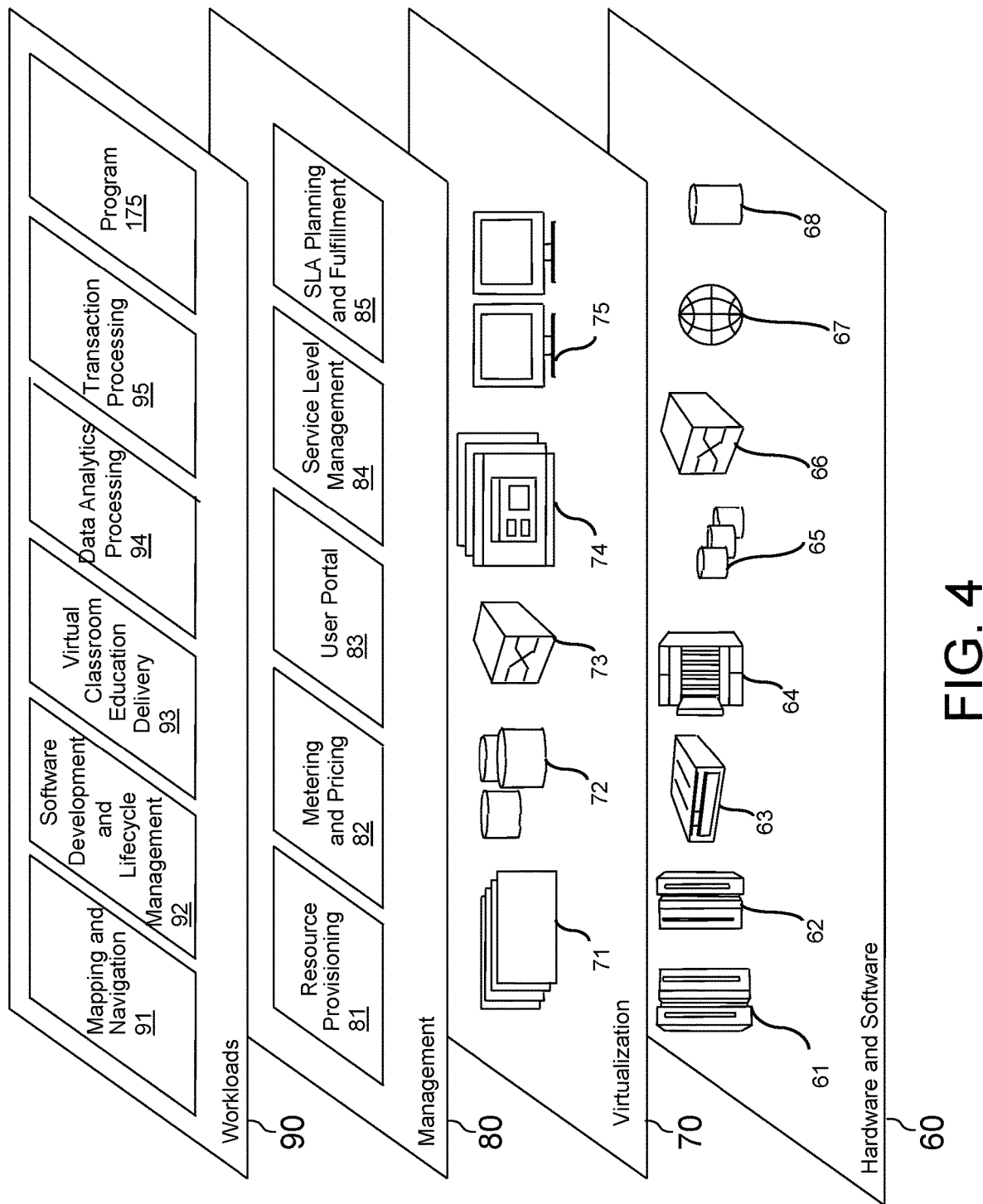
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model compression program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for domain specific model compression, the method comprising:
   providing, by one or more computer processors, a pre-trained neural network model;
   providing, by the one or more computer processors, an additional weighting parameter for a candidate operation of the pre-trained neural network model;
   applying, by the one or more computer processors, the weighting parameter to an output vector of the candidate operation;
   performing, by the one or more computer processors, a regularization of the application of the weighting parameter to the output vector, wherein the regularization comprises:
   adding a penalty term to a loss function, the penalty term associated with the weighting parameter, wherein the penalty term includes one of an absolute value of the additional weighting parameter and the square of the additional weighting parameter;
   compressing, by the one or more computer processors, the neural network model according to a result of the regularization, by removing candidate operations having a zero-value weighting parameter; and
   providing, by the one or more computer processors, the neural network model after compression.

2. The computer implemented method according to claim 1, wherein the neural network model comprises a language processing model.

3. The computer implemented method according to claim 1, further comprising training, by the one or more computer processors, the neural network using unlabeled domain data.

4. The computer implemented method according to claim 1, further comprising training, by the one or more computer processors, the neural network with two objectives, wherein one objective comprises a domain classification task.

5. The computer implemented method according to claim 1, further comprising training, by the one or more computer processors, the neural network using labeled domain data.

6. The computer implemented method according to claim 1, further comprising reducing, by the one or more computer processors, a neural network model attention head weighting value to zero.

7. The computer implemented method according to claim 1, further comprising:
   training, by the one or more computer processors, the neural network with two objectives, wherein one objective comprises a domain classification task; and
   training, by the one or more computer processors, the neural network using labeled data.

8. A computer program product for domain specific model compression, the computer program product comprising one or more computer readable storage devices and stored program instructions on the one or more computer readable storage devices, the stored program instructions comprising:
   program instructions to provide a pre-trained neural network model;
   program instructions to provide an additional weighting parameter for a candidate operation of the neural network model;
   program instructions to apply the weighting parameter to an output vector of the candidate operation;
   program instructions to perform a regularization of the application of the weighting parameter to the output vector wherein the regularization comprises:
   adding a penalty term to a loss function, the penalty term associated with the weighting parameter, wherein the penalty term includes one of an absolute value of the additional weighting parameter and the square of the additional weighting parameter;
   program instructions to compress the neural network model according to a result of the regularization, by removing candidate operations having a zero-value weighting parameter; and
   program instructions to provide the neural network model after compression.

9. The computer program product according to claim 8, wherein the neural network model comprises a language processing model.

10. The computer program product according to claim 8, further comprising program instructions to train the neural network using unlabeled domain data.

11. The computer program product according to claim 8, further comprising program instructions to train the neural network with two objectives, wherein one objective comprises a domain classification task.

12. The computer program product according to claim 8, further comprising program instructions to train the neural network using labeled domain data.

13. The computer program product according to claim 8, further comprising program instructions to reduce a neural network model attention head weighting value to zero.

14. The computer program product according to claim 8, further comprising program instructions to:
   train the neural network with two objectives, wherein one objective comprises a domain classification task; and
   train the neural network using labeled data.

15. A computer system for domain specific model compression, the computer system comprising:
   one or more computer processors;
   one or more computer readable storage devices; and
   stored program instructions on the one or more computer readable storage devices for execution by the one or more computer processors, the stored program instructions comprising:

program instructions to provide a pre-trained neural network model;

program instructions to provide an additional weighting parameter for a candidate operation of the neural network model;

program instructions to apply the weighting parameter to an output vector of the candidate operation;

program instructions to perform a regularization of the application of the weighting parameter to the output vector wherein the regularization comprises:

adding a penalty term to a loss function, the penalty term associated with the weighting parameter, wherein the penalty term includes one of an absolute value of the additional weighting parameter and the square of the additional weighting parameter;

program instructions to compress the neural network model according to a result of the regularization, by removing candidate operations having a zero-value weighting parameter; and program instructions to provide the neural network model after compression.

16. The computer system according to claim 15, wherein the neural network model comprises a language processing model.

17. The computer system according to claim 15, further comprising program instructions to train the neural network using unlabeled domain data.

18. The computer system according to claim 15, further comprising program instructions to train the neural network with two objectives, wherein one objective comprises a domain classification task.

19. The computer system according to claim 15, further comprising program instructions to train the neural network using labeled domain data.

20. The computer system according to claim 15, further comprising program instructions to reduce a neural network model attention head weighting value to zero.

* * * * *